US006345350B2

(12) United States Patent
Maruyama et al.

(10) Patent No.: US 6,345,350 B2
(45) Date of Patent: *Feb. 5, 2002

(54) INFORMATION PROCESSING APPARATUS PRINTER, METHOD OF CONTROLLING INFORMATION PROCESSING APPARATUS AND RECORD MEDIUM

(75) Inventors: Mitio Maruyama; Kazuyoshi Utsumi, both of Nagano (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/141,518

(22) Filed: Aug. 27, 1998

(30) Foreign Application Priority Data

Aug. 28, 1997 (JP) ............................................. 9-232640
Aug. 12, 1998 (JP) ........................................... 10-228434

(51) Int. Cl.$^7$ ............................................. G06F 12/00
(52) U.S. Cl. ...................................... 711/202; 711/118
(58) Field of Search ................................. 711/202, 203, 711/206, 207, 208, 5, 118

(56) References Cited

U.S. PATENT DOCUMENTS

| | | | |
|---|---|---|---|
| 5,187,792 A | | 2/1993 | Dayan et al. ................ 395/725 |
| 5,283,876 A | * | 2/1994 | Tague .......................... 711/207 |
| 5,603,011 A | | 2/1997 | Piazza .................... 395/497.01 |
| 5,794,016 A | * | 8/1998 | Kelleher ....................... 345/505 |
| 5,946,005 A | * | 8/1999 | Chiang et al. .............. 345/509 |
| 5,949,436 A | * | 9/1999 | Horan et al. ................ 345/501 |
| 6,012,135 A | * | 1/2000 | Leedom et al. ............. 711/208 |
| 6,016,529 A | * | 1/2000 | Woodman ....................... 711/3 |
| 6,038,631 A | * | 3/2000 | Suzuki et al. ............... 711/260 |
| 6,055,617 A | * | 4/2000 | Kingbury .................... 711/203 |

OTHER PUBLICATIONS

"Extending Available System Memory By User–Selectable Rom–To–Ram Configuration Remap" IBM Technical Disclosure Bulletin, vol. 33, No. 3B, Aug. 1, 1990 pp. 145–146 XP000124302.

* cited by examiner

Primary Examiner—Matthew Kim
Assistant Examiner—Christian P. Chace
(74) Attorney, Agent, or Firm—Sughrue Mion, PLLC

(57) ABSTRACT

A program space for executing a program is set in the logical memory space of CPU and the address translating destination of the program space 6 can be set in a switching mode between a ROM as a first memory and a RAM as a second memory. Thus, the address translating destination of the program space is set in the ROM when the executing speed is made increasable by utilizing the RAM as a system memory because of the presence of bulk processing data, whereas the address translating destination of the program space is set in the high-speed RAM when the RAM has a sufficient space margin.

23 Claims, 10 Drawing Sheets

INFORMATION PROCESSING APPARATUS PRINTER, METHOD OF CONTROLLING INFORMATION PROCESSING APPARATUS AND RECORD MEDIUM

BACKGROUND OF THE INVENTION

1. Field of the Invention

The present invention relates to an information processing apparatus applicable for use as a printer control unit using ROM, RAM and further a high-speed RAM incorporated in CPU.

2. Related Art

In an information processing apparatus forming an image processing unit of a page printer, as shown in FIG. 9, a program to be executed in a CPU 11 is stored in a ROM 12. When power is supplied to the information processing apparatus like this, the CPU 11 is first loaded with an initial setting program (IPL) 21 stored in the ROM 12 as shown in FIG. 10 and at Step ST1, hardware such as various interfaces (not shown) is initially set. Then jumping to the head address of a print processing program 22 of the ROM 12 is made at Step ST2 and print processing is started according to the statement of the print processing program 22 at Step ST3.

FIG. 11 shows an example of the memory space to which the ROM 12 has been allocated. The program space of a RAM 14 for use as a system memory (main memory) is allocated from an address [00000000] and the address space of the a ROM 13 for storing a font bit map data is allocated from a high-order address [1F800000] and further the address space for storing a program is allocated from an address [1FC00000]. When the CPU 11 obtains access to each of the memory addresses, a decoder 16 provided for a memory controller 15 decodes the address and supplies to each chip a chip select signal for selecting the ROM 12, the ROM 13 or the RAM 14 allocated to the address involved, so that data transfer is made between the CPU 11 and each chip.

All the address values shown in the present specification or any other one are only exceptional and cannot restrictively be interpreted.

The head address [1FC00000] allocated to the ROM 12 is made to the head address of the IPL 21 and when power is supplied, the CPU 11 interprets the command described at this address and operates to start. When the initial setting of the hardware is terminated, jumping to the head address [1FD00000] of the print processing program 22 is made and thereafter the CPU 11 operates according to the print processing program (executing program) 22.

Since the page printing printer deals with a large quantity of information, it tends to take a great deal of time necessary for interpreting the input data supplied from the personal computer on the host side and the like and translating the data into intermediate print codes and output data to be supplied to a printing mechanism. Consequently, it becomes important to improve the processing speed of the whole processing apparatus. In order to improve the processing speed, increasing the processing capacity of the CPU and improving the data transfer speed between the CPU and memories are effective. However, the ordinary ROM is accessible only at low speed and the processing speed of the whole processing apparatus is saturated with the data transfer speed with the ROM. Although CPUs offering high processing speed become available at relatively low prices in recent years, the processing speed of the whole processing apparatus is impossible to double even though the operating frequency of the CPU is rendered, for example, twice because the data transfer is needed with respect to the ROM. Consequently, though the use of a ROM offering transfer speed as high as possible is desired to build a system, such a high-speed, large-capacity ROM is absent at present and besides extremely costly. Since a ROM having a large storage capacity is required to store a program necessary for the processing of the page printer, it is actually very difficult to form a system by the use of a high-speed ROM.

The RAM can be operated at high speed in comparison with the ROM and what offers a large capacity is obtainable at relatively low prices. It may therefore be taken into consideration to copy the print processing program 22 stored into the ROM 12 in the RAM 14 and to execute the program at the time power is supplied. However, copying the print processing program 22 into the RAM 14 causes part of the RAM space used as the system memory area of the memory map 9 to be monopolized by the print processing program 22 and results in curtailing a memory capacity usable for image processing. For this reason, the data processing time necessary for color printing and high resolution printing may be prolonged.

Although the print processing program on the ROM may be considered separately usable from the print processing program copied into the RAM depending on the use condition of the RAM, different programs become necessary because there is a difference in the address on the memory space between the ROM and RAM. Consequently, two programs have to be stored in the ROM, namely, a program to be executed on the ROM and what is to be copied into the RAM and executed and this makes a large capacity ROM. Moreover, there is still a problem arising from an increase in the program development cost because two different programs need to be developed and maintained.

It is also being examined recently to employ a CPU incorporating a DRAM of about 2–3 MB together with a CPU core as a printer control system. Although the storage capacity of the DRAM incorporated in the CPU is not limited to the aforementioned, a DRAM having an extremely large storage capacity is difficult to contain in the CPU in view of the size of a CPU chip and production cost now. Notwithstanding, the processing speed can be maximized on condition that the program is copied into the DRAM incorporated in this CPU and executed because a chip-to-chip interface or the access speed of a bus for use in connecting chips is not restricted. As a result, a program can be executed at the highest speed if the program is copied into the high-speed RAM but there still remains the aforesaid address problem. Moreover, though the processing speed in a case where a working area is set in the high-speed RAM incorporated in the CPU may become higher than a case where the program is copied and executed the setting of addresses becomes complicated further and besides the processing time is prolonged. Furthermore, memories offering higher processing speed are expensive because of various reasons. Consequently, securing a sufficient memory capacity for the storage and working areas of such a program with respect to whole processing results in not only overspecification but also an increase in costs.

SUMMARY OF THE INVENTION

The present invention was made in view of the foregoing difficulties accompanying the conventional information processing apparatus. Therefore, an object of the present invention is to provide an information processing apparatus having a plurality of memories different in kinds such as ROMs and RAMs capable of executing a common executing program, capable of executing a problem on a suitable memory or setting a working area thereon.

Another object of the present invention is to provide an information processing apparatus and a method of controlling an information processing apparatus capable of improving the processing speed of the whole apparatus by optimizing the allocation of memory spaces to a RAM externally connected to a CPU or a high-speed RAM incorporated in the CPU.

It is still another object of the present invention to provide a printer offering a high printing speed using an information processing apparatus capable of performing bulk data processing such as image information by flexibly setting memory areas.

It is also a further object of the present invention to provide a method of controlling an information processing apparatus capable of executing programs by switching the programs on a plurality of memories, and a record medium stored with a program which makes the processing performable.

In an information processing apparatus having a plurality of memories different in speed according to the present invention, part of or the whole of the address of the storage area or the working area of a program out of the logical memory space of a CPU is made translatable to any one of the physical addresses of the plurality of memories, so that the plurality of memories are usable in an optimum combination that can improve processing speed. More specifically, an information processing apparatus is characterized in that it comprises a CPU, a first memory adapted to secure an storage area for storing a program executed by the CPU or the working area of the CPU, a second memory adapted to secure at least part of the storage area or the working area at a higher speed than the first memory, and address translating means capable of translating at least part of the address of the storage area or the working area out of the logical memory space of the CPU to any one of the physical addresses of the first and second memories.

In the information processing apparatus in which the first memory is a ROM which is stored with the program of the CPU and the second memory is a RAM to which the program can be transferred from the ROM, the address translating means is capable of translating the address of the program space for executing the program set in the logical memory space of the CPU to the physical address space of the ROM or the physical address of the RAM, whereby any one of the executing program on the ROM and the executing program copied or developed in the RAM is made executable in the CPU. In other words, by switching and translating the address of the program space set to the predetermined logical address to the physical addresses of the ROM and the RAM, the same executing program developed on the ROM and the RAM different in the physical address can be executed in the CPU. Consequently, the RAM space is made open by operating the CPU by means of the executing program developed on the ROM on condition that a wider RAM space utilizable as a system memory or the working area makes the processing speed higher at the time of program execution. On the other hand, the executing program is developed on the RAM to which data is transferable at high speed when the RAM space is sufficiently secured in order to improve the processing speed.

When a high-speed RAM incorporated in the CPU as the RAM to which the program is transferred exists, the use condition of the memory can be optimized so that the processing speed is improved further by allocating the working area or the storage area of the program to the high-speed RAM as the second memory under the same condition as stated above. When a program having a plurality of program modules is recorded in the ROM, moreover, it is preferred to copy the program from the ROM to the RAM on a program module basis. Since the program module copied into the RAM is prevented from being rewritten while the processing according to the program module is being executed by making the copy on the program module unit basis, the processing speed is prevented from lowering because of the overhead processing time consumed by copying.

When the first memory is the RAM connected to the CPU via an external bus and when the second memory is the high-speed RAM incorporated in the CPU, the use condition of these memories can be optimized. Since the RAM connected to the external bus and the high-speed RAM incorporated in the CPU are usable as the working areas, the use condition of the memory space for the working area can also be optimized with these working areas as the first and second memories. Particularly, a stack for retaining a register in the CPU, an input buffer for temporarily storing input data to be processed in the CPU, an output buffer for temporarily storing the output data processed in the CPU or an intermediate buffer for temporarily storing intermediate data to be processed in the CPU are working areas frequently accessed from the CPU. Therefore, high-speed processing is rendered possible by making the logical addresses of these working areas translatable to the physical addresses of the high-speed RAM as much as possible in consideration of the storage area of the program or the size of mutual working area.

The address translating means is capable of deciding the marginal space capacity of the second memory at the time of start and determining the address translating destination of the storage area or the working area of the logical memory space of the CPU and when the processing contents in the information processing apparatus are limited, the operation is easily optimized. On the other hand, the address translating means is also capable of deciding the marginal space capacity of the second memory in each job at the time of commencing the job and determining the address translating destination of the storage area or the working area of the logical memory space of the CPU and this makes an information processing apparatus fit for use in performing different kinds of processing since the memory allocation is changeable on a job unit basis.

The following steps and processing are preferably followed prior to the execution of processing in the CPU for the purpose of making optimum the allocation of the RAM space to the program area or the system memory area, which results in improving the processing speed:

1. the step of checking and deciding the marginal space capacity of the second memory;
2. the step of setting at least part of the address of the storage area or the working area out of the logical memory space of the CPU in either of the physical addresses of the first and second memories, the step of setting the address including the step of setting the address of the storage area or the working area of the logical memory space of the CPU in the physical address of the first memory when the marginal space capacity of the second memory is decided to be insufficient (first step); and
3. the step of setting the address of the storage area or the working area of the logical memory space of the CPU in the physical address allocated to the storage area or the working area of the second memory when the marginal space capacity of the second memory is decided to be sufficient (second step).

The program provided with commands for dealing with these kinds of processing may be offered by recording them on a record medium such as a ROM, a ROM module or a floppy disk which is made readable by the CPU and loading the CPU with them at suitable timing.

The checking of the RAM capacity is carried out in consideration of the installation and use environment of the RAM when the information processing apparatus is started and the address translating destination of the program space may be determined on the basis of the result determined. Furthermore, the address translating destination of the program space may also be determined in consideration of the use condition of the RAM in the job at the time of commencing each job. In the case of a printer, the use condition of the RAM in the then job may be determined on the basis of the job control command transmitted from the host side at the head of each jog.

The control of the logical address translating destination of the CPU may be realized by the use of the address decoding function of a memory controller capable of controlling access to the ROM and the RAM. Furthermore, a memory management unit (MMU) of the CPU such as a TLB (Translation Lookaside Buffer) may be used as the address translating means.

The information processing apparatus according to the present invention is fit for use as an image processing unit required for processing a large quantity of data by translating input data to output data for image forming and executing an image processing program that can be output in order to store a RAM with the output data or intermediate data thus translated in an CPU because the storage capacity of the RAM is distributed in an optimum mode as system and program memories. The adoption of the image processing unit for the provision of a printing mechanism for performing the print processing based on the output data makes it possible to provide a printer offering high printing speed necessary for color printing and high-resolution printing.

PREFERRED EMBODIMENTS OF THE INVENTION

The preferred embodiments of the present invention will now be described in detail hereinbelow with reference to accompanying drawings.

First Embodiment

First embodiment of the invention will be described with reference to FIGS. 1 to 6.

Figure 1:
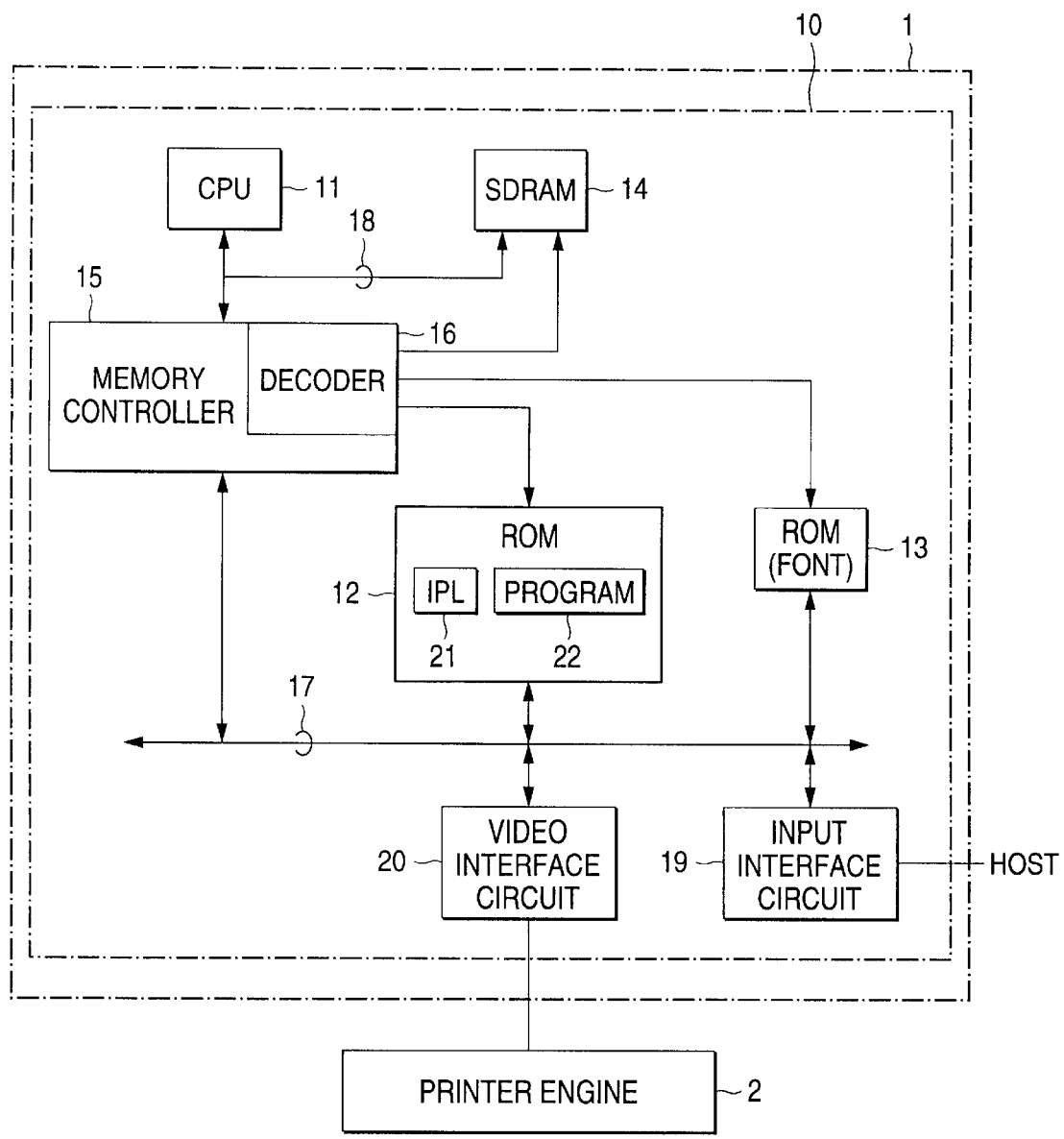
FIG. 1 is a block diagram showing the schematic construction of a printer in the first embodiment of the invention.

FIG. 1 is a schematic diagram of a laser type printer 1 capable of page printing according to the present invention. The printer 1 comprises an image processing unit 10 for receiving input data for printing purposes from the host side such as a personal computer or the like and translating the input data to output data in a printable form by means of a printing mechanism (printer engine), and a printing mechanism 2 for printing characters on printing paper according the output data. The image processing unit 10 comprises an input interface circuit 19 for receiving the input data from the host, a ROM 12 for storing print processing programs 22 for use in interpreting and translating the input data to the output data for preparing images and an IPL 21, and a ROM 13 for storing font bit map data for use in translating the input data to data for use in actually printing the input data, these being connected via a memory bus 17 to a memory controller 15. The image processing unit 10 is employed as a working area for the translating process and equipped with a synchronizing DRAM (SDRAM) 14 in which intermediate data to be translated to the output data from the out data or the input data, this SDRAM 14, a CPU 11 and the memory controller 15 being connected together by mean of a CPU bus 18.

In the image processing unit 10, the input data input from the host is translated to the output data for preparing images and the output data is supplied to the printer engine 2 via the video interface circuit 20 connected to the memory bus 17, so that page-to-page printing is made. The video interface circuit 20 is equipped with an FIFO memory for storing DMA transferred output data once as well as a shift register for subjecting the parallel-data output from the FIFO memory to serial translation, and the output data reduced to the serial form in the raster direction is transferred to the printing mechanism 2. Further, the printing mechanism 2 is permitted to exchange control signals including commands and its status with the video interface circuit 20 so that the CPU 11 of the image processing unit 10 may control the whole printer 1.

Figure 2:
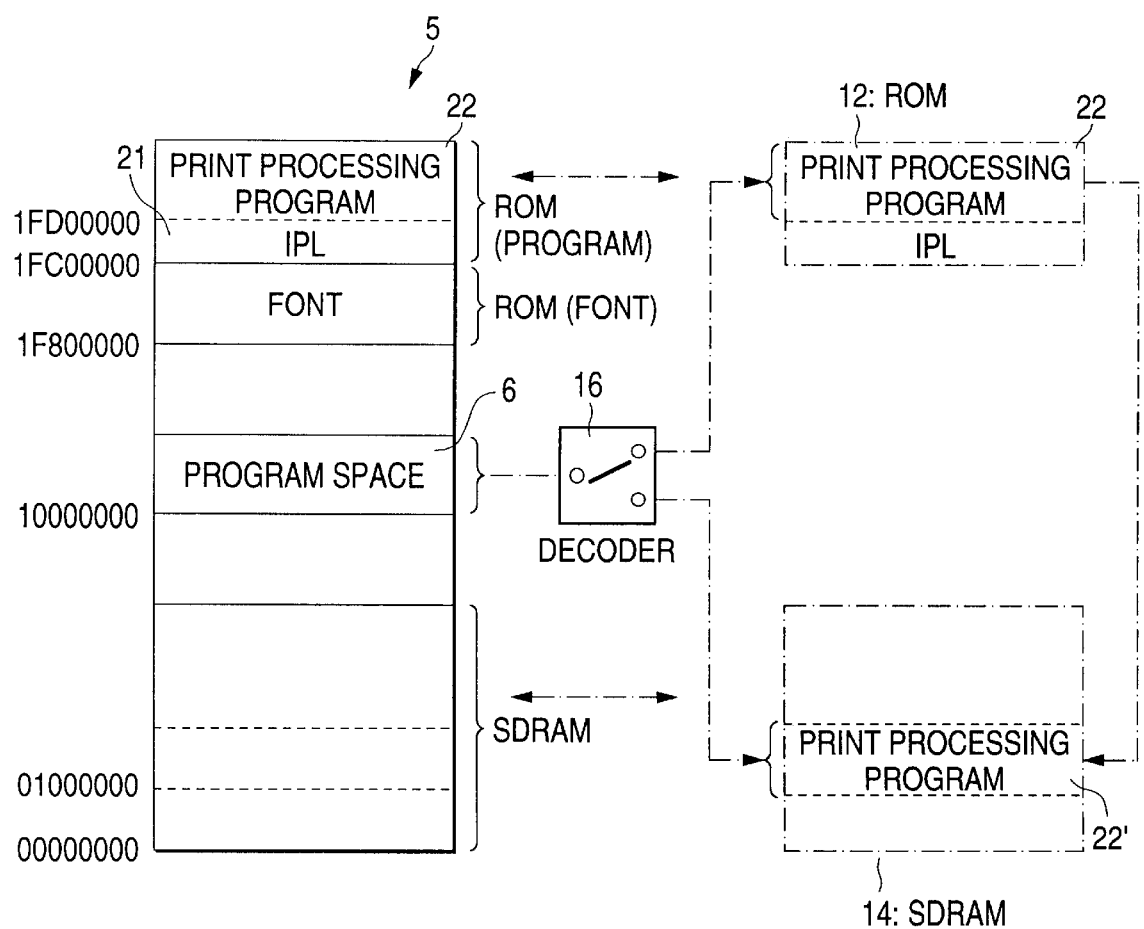
FIG. 2 is a memory map of CPU in the image processing unit of the printer in FIG. 1, showing that the address translating destination of the program space is controlled by way of example.

FIG. 2 shows a memory map 5 of the CPU 11. In the memory space 5 of the CPU 11 in this working example of the invention, a program space 6 as a special space for use in executing the print processing program 22 from an address [10000000] is set. Consequently, the processing step jumps to the head address of the program space 6 when power is supplied to execute the IPL 21 in order to terminate the initial setting of hardware in the image processing unit 10. The address of the program space 6 is decoded by the decoder 16 of the memory controller 15 and selectively translated to the address of the print processing program 22 of the ROM 12 or an address at which the print processing program 22 is developed in the SDRAM 14.

Therefore, the CPU 11 is operated by the print processing program 22 developed in the ROM 12 on condition that the address of the program space 6 as the address of the logical memory space of the CPU 11 is set up so that the address of the program space 6 may be translated to the physical address of the ROM 12 in the decoder 16.

If the decoder 16 is set up so that the address of the program space 6 is translated to the physical address of the SDRAM 14, on the other hand, the CPU 11 is operated by the program 22' developed in the SDRAM 14. Since the CPU 11 executes the print processing program 22 on the basis of the address of the program space 6 in any one of the above cases, the CPU 11 can be operated by developing the same print processing program 22 in the ROM 12 and the SDRAM 14.

In this example according to the present invention, the ROM 12 equivalent to a first memory in which the program has been recorded and the RAM 14 equivalent to a second memory operating higher in speed than the ROM 12 so that the same program developed in different physical addresses in different memories can be executed by setting the program space 6 for use in executing a virtual program beforehand in the memory space 5 of the CPU 11 in order to alter the address of the program space 6 for which translation is intended. Consequently, the program is executed by selecting the ROM 12 when it is desirable to secure a wide working area and the RAM 14 is releasable from being reserved as a programmable memory.

When the RAM 14 has a sufficient capacity, on the other hand, the print processing program 22 of the ROM 12 is developed in the RAM 14 capable of exchanging data with the CPU 11 at high speed so as to improve the program executing speed.

Since the image processing unit 10 can execute the same and common program by the use of the ROM 12 and the RAM 14, the provider of the program 22 needs not to develop a different program for ROM or RAM. For this reason, a program developing period can be shortened and besides program maintenance becomes easy. Moreover, as it is only necessary to provide the ROM stored with a program for commonly executable in the ROM and RAM, the capacity of such a ROM for storing the program is reducible.

Figure 3:
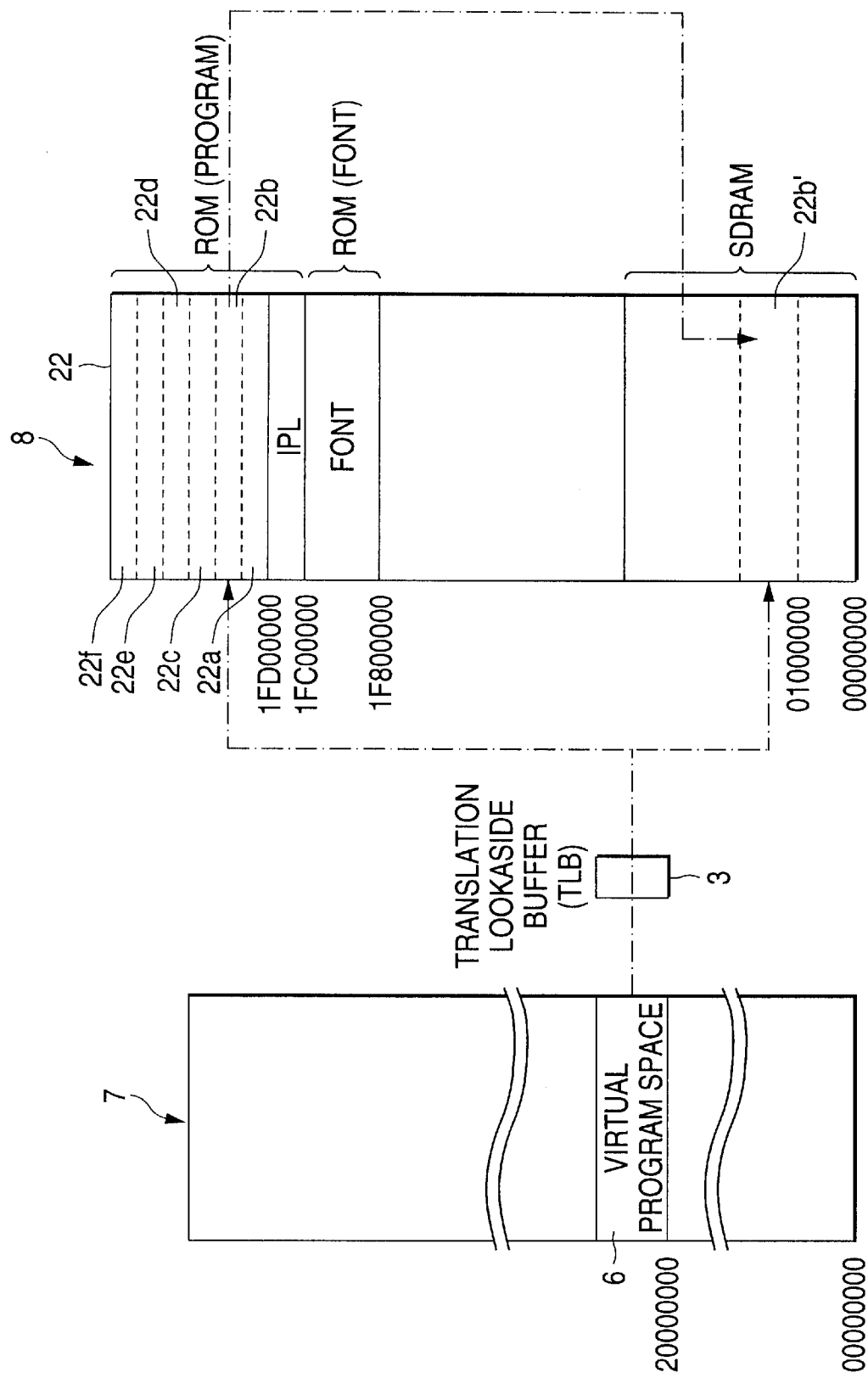
FIG. 3 is a diagram showing an example of using an address translation lookaside buffer of CPU for depicting the address translating destination of the program space.

FIG. 3 shows another example of making alterable the address of a program space for which translation is intended. In FIG. 2, the address translating function of the decoder 16 of the memory controller 15 installed outside the CPU 11 is used to switch the ROM 12 over to the RAM 14 (by means of a chip select signal) in order to gain access.

In FIG. 3, on the contrary, the function of a built-in address translation lookaside buffer (TLB) 3 of the CPU 11 is used for altering address allocation of the virtual program space 6 set in the virtual address space 7 of the CPU 11. The address translation lookaside buffer 3 of the CPU 11 functions as what is used for setting the allocation of the logical address of the virtual address space 7 in the physical address space 8 and fulfills the address translation function likewise by switching allocating destinations.

In this example, the virtual program space 6 is set from an address [20000000] of the virtual memory space 7 in this example and the TLB 3 is capable of selectively translating one of the space addresses; namely, a space address starting from a physical address [1FD00000] at which the print processing program 22 is developed in the ROM 12 and a space address starting from a physical address [01000000] at which the print processing program 22 is developed in the SDRAM 14. Thus, the translating destination is made selectable depending on the environmental or executing job condition of the image processing unit 10. The built-in address translation lookaside buffer (TLB) 3 is used to set up the address translating destination of the program space 6, whereby the CPU 11 can determine a program-to-be-executed storing destination without using an external circuit.

In this example, further, the print processing program 22 is a collection of a plurality of program modules from 22a to 22f, language-to-language modules, color image modules, for example, of ESC/P language of Seiko Epson or PCL language of Hewlett Packard. In the SDRAM 14, each program module unit is copied and the address altering destination of the program space 6 can be set up. When an address is translated using the TLB 3 so as to executed a program and if the program of the address in question is not copied, the ROM 12 is used to execute that portion or otherwise the program is executed after a suitable area of the ROM 12 including the address is copied in the SDRAM 14. When a new portion is copied while the program is executed, the time required to copy the new portion incurs overhead and this results in extending the processing time, thus lowering the processing speed.

On the other hand, one program module 22b is present in the SDRAM 14 after the program is copied into the SDRAM 14 on the program module unit basis beforehand, no paging operating for replacing the program of the SDRAM 14 during the time the program is being executed. Therefore, the copy processing time is prevented from being consumed. In the printer 1 in particular, the language program module is never replaced as the ordinary from the standpoint of the job unit is executed in the same language, under the same color or monochromatic condition. Therefore, the processing speed can be increased by making the copy in the SDRAM 14 on the program module unit basis.

Figure 4:
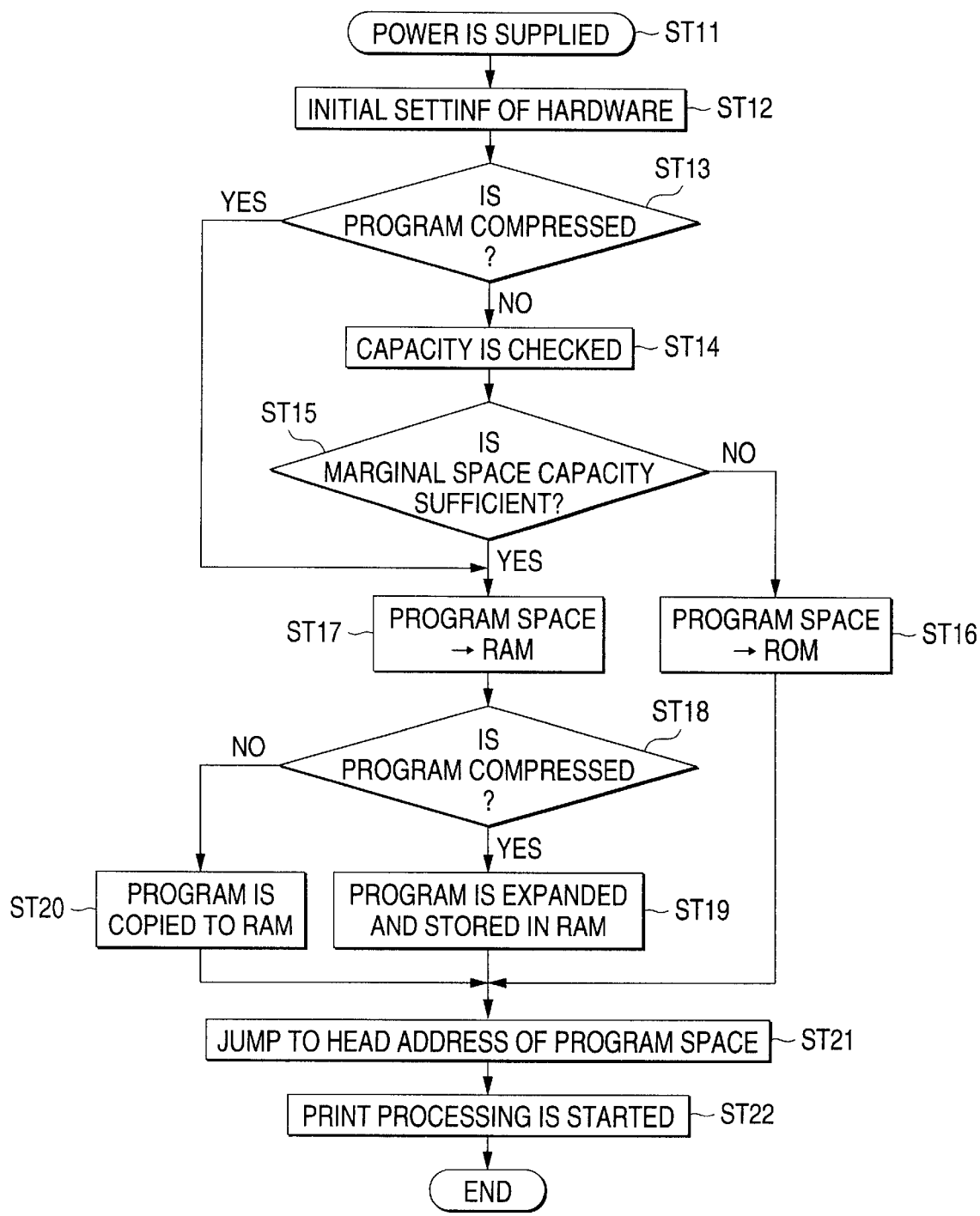
FIG. 4 is a flowchart showing the process of setting the address translating destination of the program space at the time of start.

FIG. 4 shows processing for setting the address translating destination of the program space 6 at the time of starting the printer 1. When power is supplied at Step ST11, the IPL 21 stored in the ROM 12 is executed and the initial setting of hardware such as an interface circuit at Step ST12. Subsequently, it is determined, at Step ST13, whether or not the print processing program (executing program) 22 stored in the ROM 12 has been stored in a compressed state and if not stored in the compressed state but when the program 22 stored in the ROM 12 is usable for operating the CPU 11, the packaged state of the SDRAM 14 and the like are checked at Step ST14.

When the capacity checking is carried out at Step ST14, items relative to the operating conditions of a system memory when the print job is done out of the physical environment of the printer 1 including the capacity of the SDRAM module packaged in the printer 1, whether or not color printing is carried out, the print resolution, and also the conditions of set environment using a operating panel and an initial setting application and so forth.

Although the SDRAM module is set up in this exemplary printer 1, a similar decision may be made in a printer in which a DIMM or SIMM module is set up.

At this Step ST14, the CPU 11 reads the header of the ROM 12 according to the IPL 21, interprets the contents and determines the space margin of the RAM for executing the program stored in the ROM 12. For example, the total code size of the program in the header of the ROM 12 is 4 MB and out of this, the sum of the generation of fonts most frequently employed, a management module, a language processing module such as ESC/Page and the like is 2 MB. In addition to the capacity of these programs, information about the necessity of 14 MB as the rest capacity of the RAM when the programs are copied is described. Consequently, the CPU 11 interprets these items of information and copies the whole encoded program code on condition that a RAM having a capacity of as large as 32 MB is provided.

When a RAM of about 16 MB is prepared, on the other hand, a working area of 14 MB can be secured even though the program module 2 MB most frequently utilized is copied, so that the most frequently used program module equivalent to 2 MB is copied in the RAM. When a RAM of about 4 MB is prepared, further, a working area becomes insufficient if the program is copied, the program is executed in the ROM 12.

Thus, the storage of information on deciding the capacity necessitated for the RAM in the header of the ROM 12 and further the instruction as to whether the program is executed when the program is not copied in the RAM or otherwise a service call is issued allows the CPU 11 to interpret the contents and perform the process according to the IPL 21, whereby the IPL 21 can be prepared for general use. In consequence, the processing fit for the program thus stored may be performed only by replacing the ROM 12 stored with the program.

As stated above, the address translating destination of the program space 6 is set up in the ROM 12 when the marginal space capacity of the RAM is determined not sufficient at Step ST15 as a resulting of checking the capacity of the RAM according to the header information of the ROM 12 at Step ST16. Thus, the CPU 11 is operated according to the program 22 developed in the ROM 12, and the memory space of the RAM 14 is released from the program memory and widely utilized as a system memory.

On the other hand, the address translating destination of the program space 6 is set up in the RAM 14 at Step ST17 when the marginal space capacity of the RAM is determined sufficient at Step ST15. The address translating destination of the program space 6 is set up in the RAM 14 without checking the capacity of the RAM because the compressed program 22 stored in the ROM 12 needs extending and developing. Subsequently, it is confirmed whether or not the program 22 is compressed in the ROM 12 at Step ST18 and when the program is compressed, it is extended at Step ST19 before being maintained in the predetermined address space of the RAM 14. When the program 22 is offered in such a condition as to be executed in the ROM 12, on the other hand, the program 22 is copied from the ROM 12 to RAM 14 at Step ST20.

The address translating destination of the program space 6 is set up at these steps and when the RAM 14 is selected, the program 22 is developed in the predetermined space of the RAM 14, whereby jumping to the head of the program space 6 is made at Step ST21. Then the CPU 11 performs the print process using the program space 6 at Step ST22.

Figure 5:
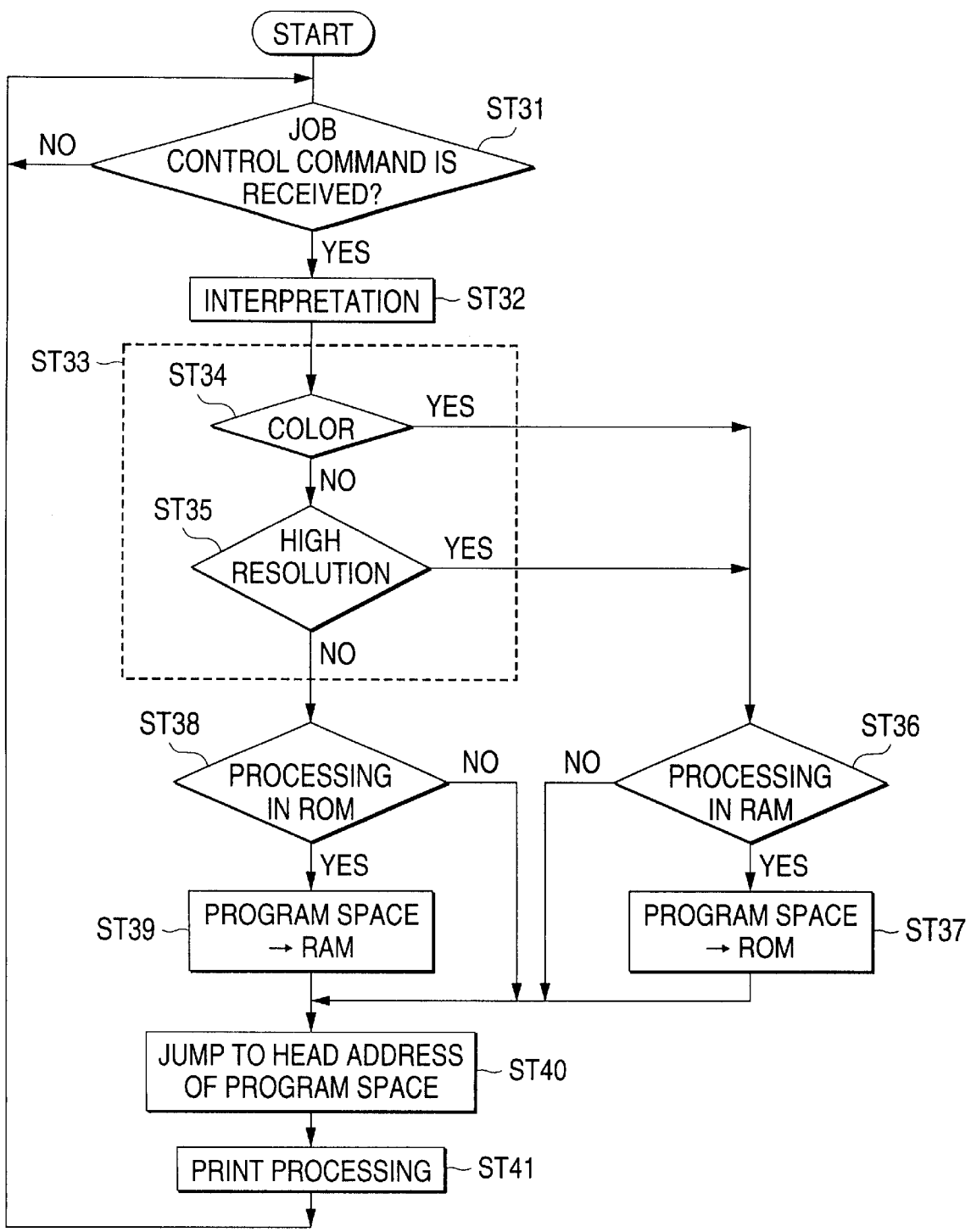
FIG. 5 is a flowchart showing the process of setting the address translating destination of the program space prior to a job.

FIG. 5 shows the process of setting the address translating destination of the program space 6 prior to each job to be executed in the printer 1. The input data 50 supplied from the host side in order to perform the print process in the printer 1 essentially consists of as shown in FIG. 6 a job control command 51 and print data 52 that follows the job control command 51. The job control command 51 describes information as to estimating the use condition of the memory when the print process such as resolution 51c, the necessity of color printing and the like in addition to the definition of the job language 51a and the definition 51b of the descriptive language of the print data 52.

For this reason, the space marginal space of the RAM during the job can be decided by interpreting the job control command 51 prior to commencing the job, so that it can be determined whether the program 22 is executed in the ROM 12 on a job basis or the program 22 is executed after it is copied in the RAM 14.

Further, the language used in the job or the necessity of color printing is made clear by interpreting the job control command 51 and out of a plurality of program modules constituting the program 22, the program modules necessary for the process are proved. Consequently, the storage area of the RAM 14 can be utilized more effectively by copying one or several program modules necessary for the job instead of copying the whole program 22 into the RAM 14. Moreover, overhead is also preventable as stated above through the paging operation by copying the program module on the program module unit basis.

When the input data 50 is transmitted after the transmission of the job control command 51 from the host is waited for at Step ST31 first, the preceding job control command 51 is interpreted at Step ST32. Then the marginal space capacity of the RAM in the job is checked at Step ST33. At Step ST33 in this example, whether or not color printing is carried out at Step ST34 is decided. When the color printing is carried out, a wider address space usable as the system memory makes the processing speed improvable since a large quantity of data is processed in the image processing unit 10. Consequently, the address translating destination of the program space 6 in the present state is decided at Step ST36 and when the RAM 14 is the address translating destination of the program space 6, the address translating destination of the program space 6 is altered to the ROM 12 at Step ST37.

When high-resolution printing is carried even in the case of not color printing but monochromatic printing, on the other hand, a large quantity of data is processed likewise. Then the resolution is decided at Step ST35 and in the case of resolution at 600 DPI or higher, for example, the program is preferably executed in the ROM 12 without setting the program area in the RAM 14. Therefore, the address translating destination of the program space 6 is set in the ROM 12 at Step ST37 likewise.

When the resolution is not so high as 300 DPI in the case of monochromatic printing, the processing speed becomes higher than a case where the program is executed in the RAM 14 with higher data transmission speed since the marginal space capacity of the RAM utilized as the system memory is enough. When the job is decided to be what is of low resolution as a result of interpreting the job control command, whether or not the present address translating destination of the program space 6 has been set in the ROM 12 at Step ST3 38 is decided and if the address translating destination is set in the ROM 12, the address translating destination of the program space 6 is altered to the RAM 14 at Step ST39 and then the print processing program 22 is copied into the RAM 14 from the ROM 12.

After the address translating destination of the program space 6 is set so that the use quantity of the RAM 14 and the program processing speed are optimized according to the job control command 51, jumping to the head address of the program space 6 is made at Step ST40 and the CPU 11 starts the print processing at Step ST41.

In this way, whether the executing program 22 of the CPU 11 is executed on the RAM 14 capable of high-speed processing or on the ROM 12 which allows the RAM 14 to be widely utilized as the system memory though the latter is low in speed can be decided and set before the printer 1 is started or the job is commenced.

Figure 6A:
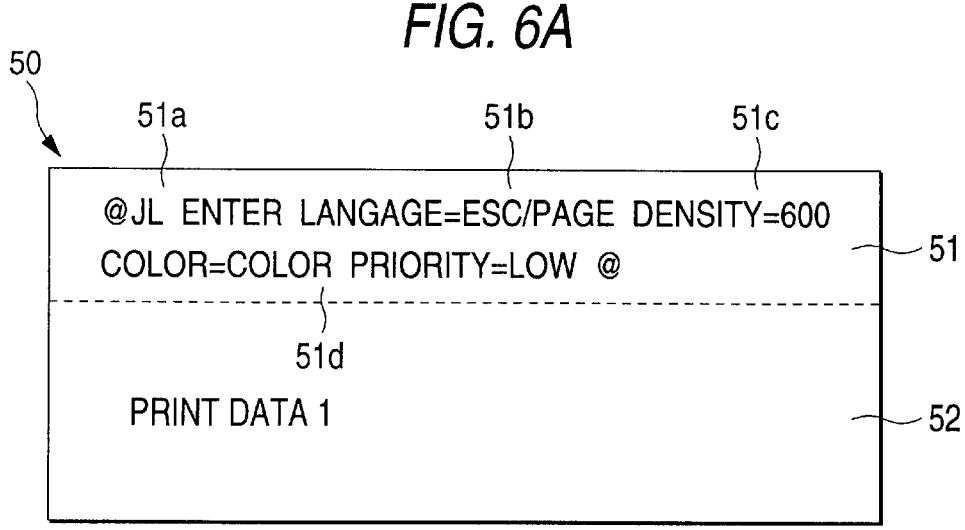
FIGS. 6A–6C are diagrams showing examples of input data to be supplied on a job basis.

In the case of the job shown in FIG. 6A, high-speed image processing and print processing can certainly be performed by the CPU 11 using sufficient system memory according to the executing program 22 developed on the ROM because color printing is carried out.

Figure 6B:
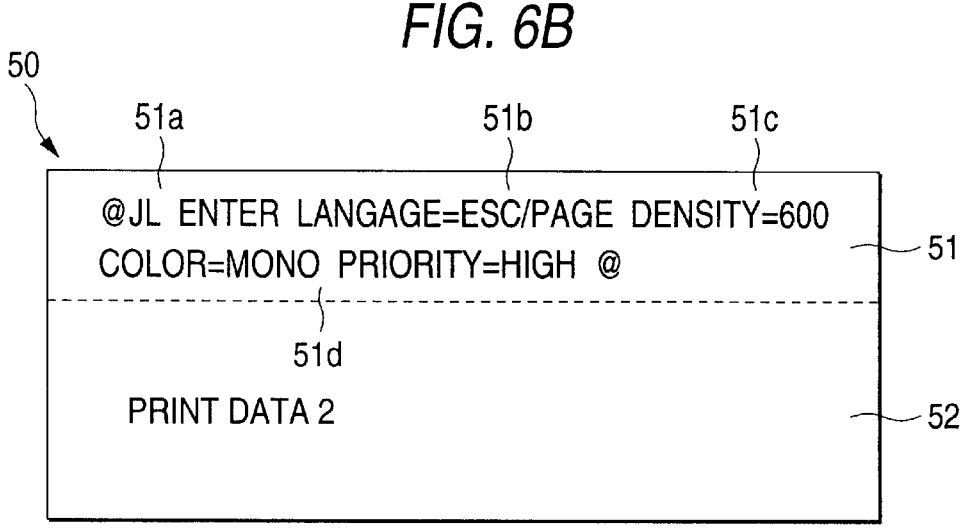

In the case of the job shown in FIG. 6B, the processing is performed according to the executing program 22 developed on the ROM 12 likewise since the resolution is as high as 600 DPI, though monochromatic printing is carried out.

Figure 6C:
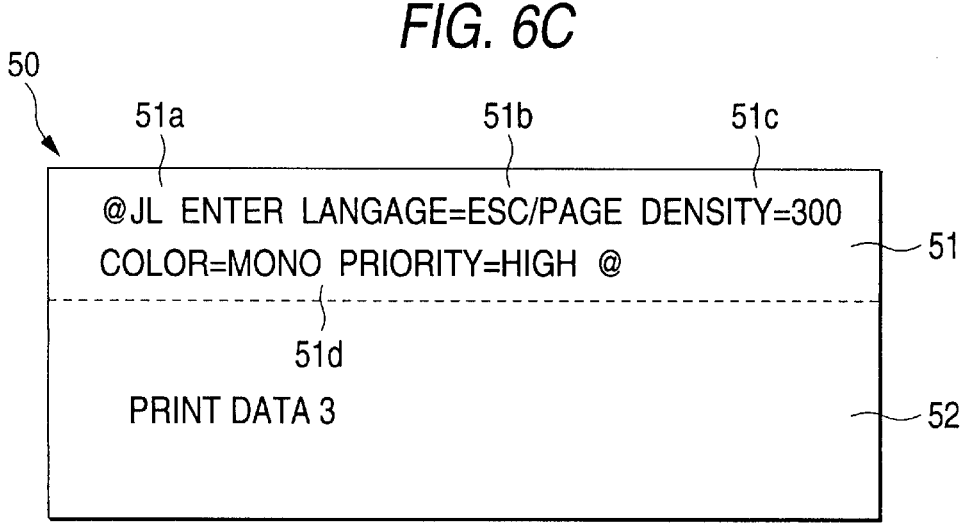

In the case of the job shown in FIG. 6C, the RAM has a relatively large marginal space capacity as the monochromatic resolution is as low as 300 DPI. Consequently, the executing program 22 is copied into the RAM and then the CPU performs the processing according to the program on the RAM. Thus, the high-speed data transfer between the CPU and the memory becomes possible to ensure that the processing speed is made improvable thereby.

Various kinds of processing as illustrated in FIGS. 4 and 5 or the program provided with the command capable of serially dealing with both kinds of processing as illustrated therein may be offered by storing them in the ROM 12 as part of the IPL 21. An independent program for determining the address translating destination of the program space may also be stored in the ROM 12 and offered. Furthermore, a command capable of fulfilling the similar function may be affixed to the head of the print processing program 22 or may otherwise be offered via a record medium such as a floppy disk that is or can be installed in the ROM. Moreover, these programs may be offered via a computer network such as the Internet.

Although a description has been given of the invention based on a printer dealing with a large quantity of image data until now, the invention is applicable to not only such a printer but also needless to say any other information processing apparatus dealing with a large quantity of image data such as image processing.

Second Embodiment

Figure 7:
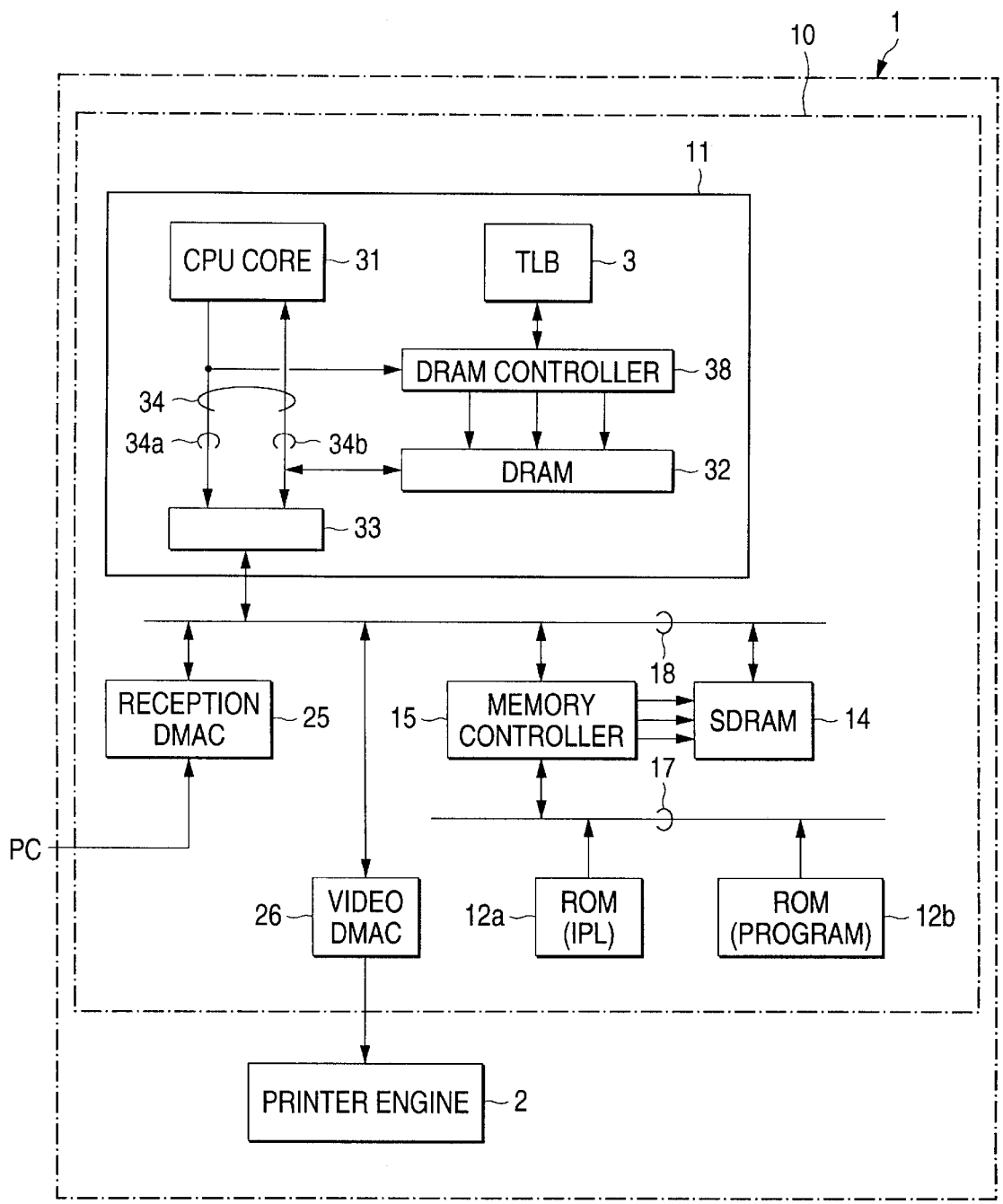
FIG. 7 is a block diagram showing the schematic construction of a printer in the second embodiment of the invention.

Second embodiment of the invention will be described with reference to FIGS. 7 and 8. As shown in FIG. 7, a control system (image processing unit) 10 of a printer 1 in this example is such that a CPU 11 is connected to a working SDRAM 14 and a memory controller 15 for managing the SDRAM 14 and other memories via a CPU bus 18. Furthermore, a ROM 12a stored with an initial setting program IPL and a ROM 12b stored with a plurality of program modules for executing an image processing function, a language processing function and the like are connected to the memory controller 15 via an external bus (memory bus) 17. To the CPU bus 18, moreover, a reception DMA controller 25 for DMA transferring print data and a DMA controller 26 for DMA transferring the image data processed in the CPU 11 to a printing mechanism (engine) 2 are connected.

The CPU 11 in this example is provided with a high-speed DRAM 32 incorporated in the CPU 11 in addition to the SDRAM 14 connected via the external bus (CPU bus) 18 to the CPU 11. In the CPU 11, furthermore, a CPU core 31 is coupled to the incorporated DRAM 32 via a data bus 34b of an internal bus 34, so that a DRAM controller 38 thus coupled via the data bus 34b of the internal bus 34 can obtain access to the incorporated DRAM 32. As the CPU 11 is connected to the SDRAM 14 or the ROM 12 outside the CPU 11 via an external bus control unit 33, it can obtain access to the SDRAM 14 or the ROM 12. Consequently, the ROMs 12a, 12b, the SDRAM 14 and the incorporated high-speed RAM are utilizable as the storage area or working area of the program of the CPU core 31.

The logical address of the CPU core 31 is translated to any one of the physical addresses of these memories by mean of a TBL 3 so as to make these three kinds of memories flexibly utilizable in the CPU core 31.

It is also being examined recently to employ a CPU incorporating a DRAM 12 of about 3 MB together with a CPU core 11 in the printer 1. Although the storage capacity of the DRAM incorporated in the CPU is needless to say not limited to the aforementioned, a DRAM having an extremely large storage capacity is difficult to contain in the CPU in view of the size of a CPU chip and production cost now. Notwithstanding, the CPU incorporating the DRAM like this can be accessed at high speed because the use of the incorporated DRAM shortens the access time to the CPU core and also because the bus width is not restricted. Therefore, the processing speed can be maximized on condition that the program is copied into the incorporated DRAM and executed.

Furthermore, the DRAM actually incorporated in the CPU and having a limited storage capacity may be used to make the DRAM 32 execute the program provided a program module to be copied into the RAM can be limited through the aforesaid TLB technique. Particularly, in an information processing apparatus for special use in a printer or a scanner which is different from PC anticipated to be able to execute a general-purpose application and add the processing thereto at high speed, the program module executed in the CPU is limited in consideration of a job unit. Consequently, the use of even a virtual storage technique using MMU such as TLB hardly gives a chance of reducing the processing time of the CPU for paging because of TLB miss, whereby processing speed can greatly be improved.

As explained in the previous example, the sum total of the whole encoded program stored in many printers amounts to about 4 MB and out of them, the total of one of a font generating module frequently accessed, a managing module and a language module, for example, ESC/Page module of Seiko Epson is about 2 MB.

Therefore, if the high-speed DRAM 32 of about 2 MB is incorporated in the CPU 11, the processing time can greatly be shortened by copying and using the program module most frequently accessed by the DRAM 32. The capacity of the high-speed DRAM 32 is preferably large enough for the program module to be copied and in view of setting a working area, which will be more fully discussed.

However, as previously noted, the presence of about 2 MB makes it possible to anticipate sufficient effect of improving the processing speed by copying the program module. Furthermore, if the DRAM 32 having a capacity of about 3 MB is incorporated in the CPU, the area left after the program module is copied can be set as the working area. Moreover, if the DRAM 32 having a capacity of about 4 MB is incorporated, most of the encoded program module can be copied into the DRAM 32 so as to control the printer, whereby the processing speed is set higher.

If half the capacity of about 4 MB is used to copy the program module with the remaining 2 MB used for the working area, the working area frequently accessed by the CPU core such as an intermediate buffer or a band buffer can be set with the effect of improving the processing speed.

Although most the program modules thus frequently accessed account for the language processing modules whose capacity is about 1 MB, the language processing module necessary for one job is only one in view of the job unit, so that the high-speed DRAM 32 of about 3 MB is made extremely effectively usable by replacing the language processing module different in processing language when the job is changed. When a job adopting PCL of Hewlett Packard as the processing language is input after a job adopting ESC/Page as the processing language is terminated, for example, it is only needed to replace the language module with the PCL module.

Moreover, a memory adopted in the primary and secondary cache of a CPU for PC is a SRAM (static RAM) shorter in cycle than DRAM (dynamic RAM). Thus, data on the cache memory should ensure that it is identical with data on the storage medium of an external RAM or a hard disk. For this reason, a circuit for managing the cache of a write through or a write back cache system is required to be incorporated together with a SRAM in a large circuit scale and this results in greatly increasing an area for the cache and making it difficult to increase the storage capacity.

On the contrary, the DRAM can be small in circuit scale in comparison with the storage capacity and consequently incorporated at relatively low cost even in the CPU even if it is a memory having a large storage capacity.

Furthermore, in an information processing apparatus specializing in particular use not such as a general-purpose information processing apparatus like PC but a printer, the memory incorporated in the CPU is utilized as an area for use in executing a program or a temporary working area where data is unnecessary for holding identity with data on an external RAM or a hard disk, which makes unnecessary a cache managing circuit.

As previously noted, in an information processing apparatus specializing in special use as a printer, since the frequency of rewriting the memory within the CPU is low in view of the job unit, the DRAM has the effect of sufficiently improving the processing speed.

Therefore, the printer in this example uses the TBL 3 to allocate the program storage area that has heretofore been allocated to the ROM 12 or the RAM outside the CPU 11 and further the program executing working area that has heretofore been allocated to the RAM 14 even to the high-speed RAM 32 with the high-speed RAM 32 shorter in access time than the RAM 14 as a second memory. Then what needs high-speed operations is allocated to the high-speed RAM 32 and anything other than that is allocated to the external RAM 14, whereby a printer capable of high processing can be provided at low cost.

Figure 8:
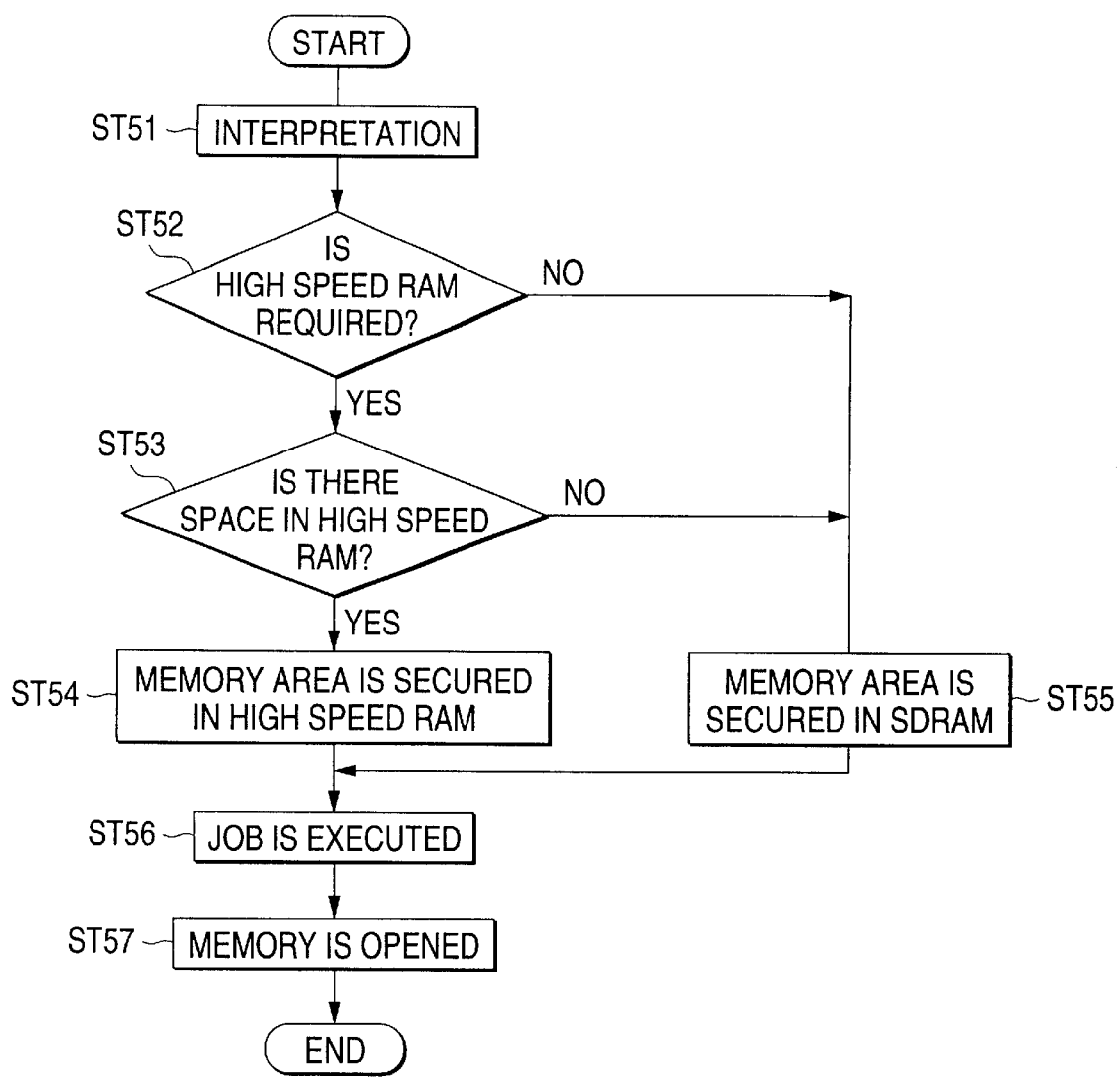
FIG. 8 is a flowchart showing the process of making usable the high-speed RAM incorporated in CPU.
Figure 9:
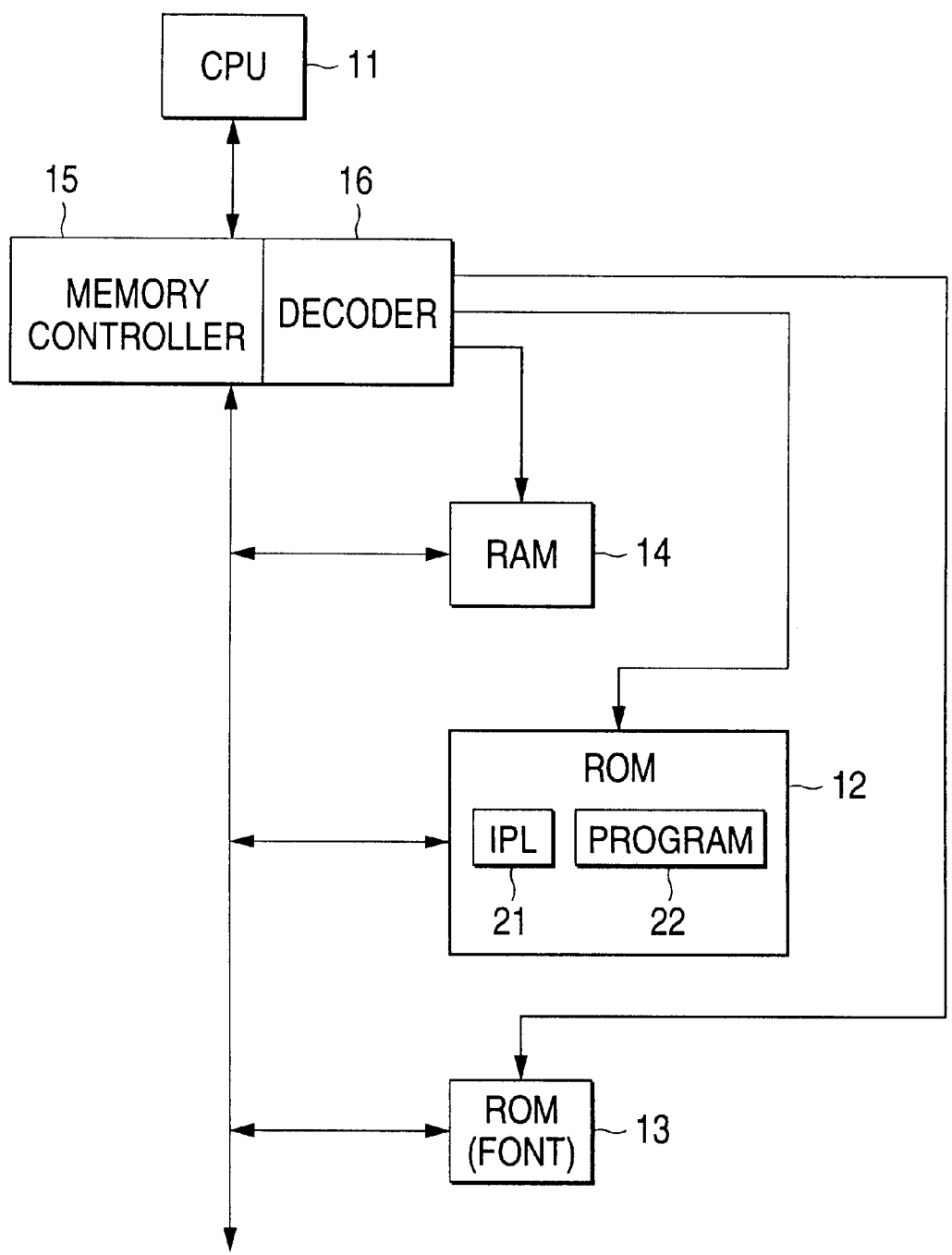
FIG. 9 is a block diagram showing the schematic construction of a conventional information processing apparatus such as an image processing unit.
Figure 10:
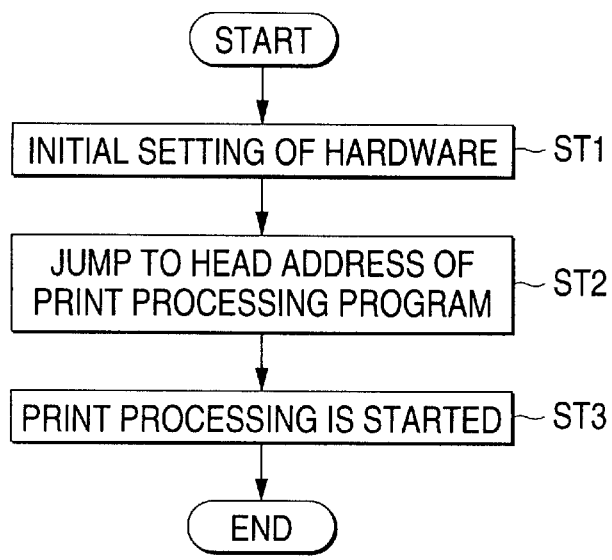
FIG. 10 is a flowchart showing the process of IPL of the conventional information processing apparatus.
Figure 11:
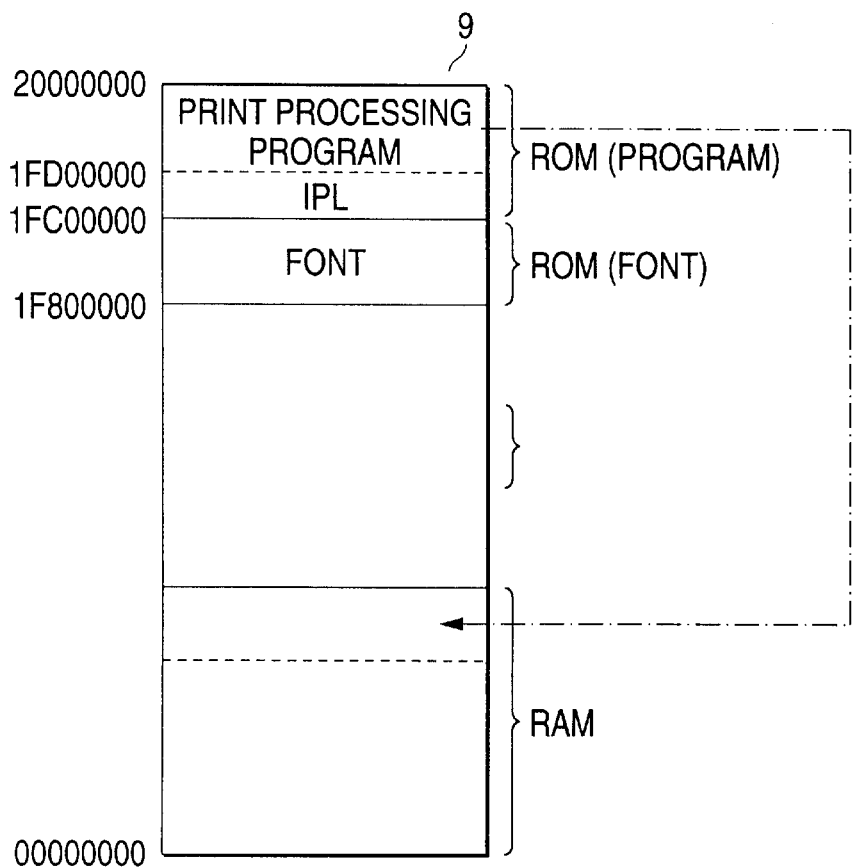
FIG. 11 is an example of the memory map of CPU.

FIG. 8 shows the process of allocating the program storage area or the program executing working area to the high-speed RAM 32 with reference to a flowchart. A procedure for allocating a program or a program module to the high-speed RAM 32 is similar to what has been described in the preceding mode for carrying out the invention, wherein as a first memory for the purpose, the ROM 12 or the SDRAM 14 is employed, whereas as the second memory therefor, the high-speed RAM 32 is used. Consequently, a description will subsequently be given of a procedure for setting several working areas in the high-speed RAM 32 and the effect when the working areas are set.

It is assumed that an intermediate buffer as input/output destinations is set in the high-speed RAM 32 when the CPU core 31 is used to process image data. When the image data is sent from a host PC, the printer stores the data in a reception buffer once. Subsequently, the data stored in the reception buffer is interpreted by EXC/Page language module of Seiko-Epson as a job language, for example and recognized as image data. Then the language module starts the work of translating the image data into an intermediate code.

At this time, the image data needs to be translated so that it is fit for the band buffer of the printer, thus requiring a working area for the data to be input/output, in cases where the image data has multi-gradation, where it is different in resolution, where its size is greater than that of the band buffer as an output destination and so forth. During the work of inputting/outputting the image data like this, it is extremely important to improve the access speed to the working area in order to shorten the processing time since the CPU core 31 frequently obtains access to the working area.

More specifically, at Step ST51 of a flowchart of FIG. 8, the language module executed in the CPU core 31 interprets the contents at the next process step and outputs a request for a necessary RAM capacity and the use of the high-speed RAM to the TBL 3 functioning as a memory manage or a memory manger program operating in the CPU core 31. The memory manager first checks where the high-speed RAM 32 is desired at Step ST52 and if the high-speed RAM 32 is desired, then checks whether the capacity desired for the high-speed RAM 32 is secured at Step ST53.

Then the memory manager secures an input/output working area (intermediate buffer) if there is a free space exceeding the capacity thus desired for the high-speed RAM 32 at Step ST54. The TBL 3 is set so that the physical address of the working area (intermediate buffer) of the CPU core 31 is translated to the physical address of the working area thus secured in the high-speed RAM 32.

Furthermore, the memory manager calculates the quantity left from that of the high-speed RAM 32 and then returns to the language module called for by the memory manager.

When the intermediate buffer for inputing/outputting purposes is secured in the high-speed RAM 32, the CPU core 31 translated the image data using the intermediate buffer at Step ST56 and performs the image processing in the band buffer using an intermediate code that is supplied to the working area. At the termination of these kinds of processing, the CPU core 31 sends a request for opening the working area secured in the high-speed RAM 32 to the memory manager again at Step ST57 because the working area secured in the high-speed RAM 32 becomes unnecessary and terminates a series of jobs. On receiving the releasing request, the memory manager releases the unnecessary memory on the high-speed RAM so as to deal with a subsequent request for the high-speed RAM.

When no request is made for the high-speed RAM at Step ST52 or when no free space is found in the high-speed RAM at Step ST53, the memory manager secures an intermediate buffer for inputting/outputting purposes in the SDRAM 14 at Step ST55. Then the TBL 3 is set so that the physical address of the intermediate buffer of the CPU core 31 is translated to the physical address of the intermediate buffer thus secured in the SDRAM 14. Therefore, the CPU core 31 performs the processing using the intermediate buffer set in the SDRAM 14 in this case.

Moreover, high-speed processing can be attempted by utilizing the high-speed RAM 32 incorporated in the CPU 11 as a stack, which is a memory (working area) for calling each function and preserving the executing address at the time of return or a register within the CPU core and in the case of multitask OS, allocated to each task. The working area allocated as the stack is always used for calling the function and at the time return, whereby high-speed function processing is realized by allocating the working area to the high-speed RAM 32.

The OS is used to start the task. When the OS is requested to start the task, it interprets the condition of starting the task and demands the memory manager to secure a memory (working area) necessary for the task to be started. The conditions of starting the task include execution priority, the necessary memory and so forth.

When the execution priority is high, the OS interprets that the provision of the working area in the high-speed RAM 32 is preferred and requests the use of the high-speed RAM 32 for the memory manager likewise. Then the memory manager sets a working area for the stack in the high-speed RAM 32 through the processing shown in FIG. 8. The OS sets the stack in the working area thus secured and jumps to the commencing address of the program for starting the task, so that the task is commenced. This task is operated at high speed since the stack is secured in the high-speed RAM.

Furthermore, the image processing can be performed at high speed by securing the band buffer for outputting the image data sent to the printing mechanism 2 of the printer. In this case, a request for the use of the high-speed RAM 32 is sent to the memory manager at the initializing time when a program module (image module) having the function of imaging the intermediate code in the band buffer is executed. The memory manager then sets the band buffer in the high-speed RAM 32 in accordance with the processing shown in FIG. 8.

However, the band buffer is set in the SDRAM 14 as before when the memory capacity of the high-speed RAM 32 is short. When the band buffer is set in the high-speed RAM 32, the image module images the intermediate code in the high-speed RAM 32 and when an image equivalent to one band is terminated, transfers the data in the band buffer to the printing mechanism 2 using the function of the DMA controller incorporated in the CPU 11 for printing purposes.

It is possible, on the other hand, to transfer the data equivalent to one band thus imaged in the high-speed RAM 32 to the SDRAM 14 once and then to the printing mechanism 2 using an external DMAC 22 from the external SDRAM 14. When the data is transferred in this method, an image processing having high access frequency to the band buffer is performed in the high-speed RAM 32 and the transfer process is performed by the use of the external DMAC 26 in line with the processing speed of the printing mechanism 2, whereby the band buffer set in the CPU core 31 and the high-speed RAM 32 can commence processing equivalent to the next one band. Therefore, image processing is performable at higher speed.

It is also effective to set a temporarily stored reception buffer in the high-speed RAM 32 on receiving image data from an external PC in order to increase the processing speed using the external bus (CPU bus) with efficiency. In a case where the reception buffer is set in the high-speed RAM 32 incorporated, the following is preferred. A module having the function of receiving image data from PC demands the memory manager to set the second reception buffer when the reception buffer is set in the external SDRAM 14 prior to reception. The memory manager sets the second reception buffer through the processing shown in FIG. 8 when a free space is found in the high-speed RAM 32. Then the TBL 3 is set so that the logical address of the reception buffer of the CPU core 31 is translated to the physical address of the high-speed RAM 32.

When image data is input by the reception DMA controller 25 from the PC, the image data is first written to the reception buffer set in the SDRAM 14. When the reception buffer set in the SDRAM 14 is filled up, the image data is transferred to the second reception buffer set in the high-speed RAM 32. The language processing module in the CPU core 31 commences the process of analyzing the image data transferred to the second reception buffer of the high-speed RAM 32. In the mean time, the next image data is received by the reception buffer set in the SDRAM 14 in parallel to the processing in the CPU core 31.

The second reception buffer is set in the SDRAM 14 and when the reception buffer is filled up, the image data may be transferred to the second reception buffer for the purpose of continuing the reception. When a request for the use of the external bus 18 is sent to the CPU 11 from the reception DMAC 25, however, the access speed to the second reception buffer becomes extremely slowed since the CPU 11 is unable to use the external bus 18.

In the aforesaid processing, on the contrary, the processing in the CPU core 31 is accelerated by setting the second reception buffer in the high-speed RAM 32 whose access speed is high but also the process of obtaining access to the second reception buffer on the part of the CPU core 31 does not compete with the process of receiving the image data from the PC, so that high-speed reception processing becomes performable.

As set forth above, in the information processing apparatus having the first memory in which the storage area or the working area of a program can be set in that the ROM, the RAM dealing with processing at high speed with respect to the ROM or the high-speed RAM incorporated in the CPU and capable of performing the processing at higher speed than the processing speed of the RAM, and the second memory higher in speed than the first memory, the address translating means such as the TBL 3 is used for translating the predetermined address of the logical memory space of the CPU into any one of the first and second memories.

Therefore, the storage area of the program or part of the program module and further the program executing working area can be set in either of the first and second memories. Thus, the allocation of memories fit for the contents of a job to be processed in the information processing apparatus such as the image processing unit of a printer is made in order to flexibly mange high-speed and expensive memories with the effect of providing an inexpensive information processing apparatus capable of high-speed processing and a printer using the information processing apparatus.

Moreover, a single executing program is made executable on the ROM and the RAM by providing the virtual program space for the logical address of the CPU so as to set the address translating destination of the program space in a switching mode between the ROM and the RAM, so that an information processing apparatus capable of switching the address translating destination in harmony with the memory and environmental conditions of the packaged memory and the executing condition of a job without newly developing a program.

Furthermore, it is possible to optimize the allocation of RAMs and use them efficiently in line with these conditions simultaneously with the setting of an optimum system for permitting the information processing apparatus or the printer to perform the whole processing in consideration of the speed of executing the program.

Therefore, a printer offering high printing speed can be provided by setting the optimum quantity of the memory for use as well as the optimum speed of executing the program when a demand for color printing and high-resolution printing is developed.

What is claimed is:

1. An information processing circuit used for a printing apparatus comprising a CPU, a ROM which secures one of a storage area for storing a printing-related program executed by the CPU and a working area of the CPU, said printing-related program having a plurality of program modules being recorded in the ROM;

a RAM which secures at least part of one of the storage area and the working area at a higher speed than the ROM and to which at least one of the program modules can be transferred from the ROM on a basis of said program module so that a portion of said printing-related program that is less than the entire printing-related program can be transferred from the ROM and address translating means which is capable of translating address of the program space set in the logical memory space of the CPU to any one of a physical address of the program stored in the ROM and a physical address of the RAM to which said at least one of the program modules is transferred.

2. An information processing apparatus as claimed in claim 1, wherein the RAM is a high-speed RAM incorporated in the CPU.

3. An information processing apparatus as claimed in claim 1, wherein the ROM is connected to the CPU via an external bus and wherein the RAM is incorporated in the CPU.

4. An information processing apparatus as claimed in claim 3, wherein the working area is one of a stack for retaining a register in the CPU, an input buffer for temporarily storing input data to be processed in the CPU, an output buffer for temporarily storing the output data processed in the CPU and an intermediate buffer for temporarily storing intermediate data to be processed in the CPU.

5. An information processing apparatus as claimed in claim 1, wherein the address translating means determines a marginal space capacity of the RAM at the time of start and determines the address translation destination of the storage area or the working area of the logical memory space of the CPU.

6. An information processing apparatus as claimed in claim 1, wherein the address translating means determines a marginal space capacity of the RAM in each job at the time of commencing the job and determines the address translating destination of the storage area or the working area of the logical memory space of the CPU.

7. An information processing apparatus as claimed in claim 6, wherein the address translating means determines the marginal space capacity of the RAM in the job according to a job control command.

8. An information processing apparatus as claimed in claim 1, wherein the address translating means uses the address decoding function of a memory controller capable of controlling access to the ROM and RAM.

9. An information processing apparatus as claimed in claim 1, wherein the address translating means uses an address translating function incorporated in the CPU.

10. An information processing apparatus as claimed in claim 1, wherein the program is an image processing program for translating input data to output data.

11. A printer having the information processing apparatus described in claim 10 and a printing mechanism capable of performing a printing operation according to the output data.

12. A method of controlling an information processing apparatus comprising a CPU, a first memory which secures one of a storage area for storing a printing-related program executed by the CPU and a working area of the CPU, a second memory which secures one of at least part of the storage area and the working area at a higher speed than the first memory, the method comprising the steps of setting one of at least part of an address of the storage area and the working area out of a logical memory space of the CPU in either of physical addresses of the first and second memories, checking a capacity in order to decide the marginal space capacity of the second memory before translating the address, setting the address including a first step of setting one of the address of the storage area and the working area of the logical memory space of the CPU in the physical address of the first memory when a marginal space capacity of the second memory is determined to be insufficient, and a second step of setting one of the address of the storage area and the working area of the logical memory space of the CPU in one of the physical address allocated to the storage area and the working area of the second memory when the marginal space capacity of the second memory is sufficient wherein said marginal space capacity is decided prior to said setting step and wherein said marginal space capacity can be determined to be insufficient when said marginal space capacity is a non-zero amount that is less than a required capacity.

13. A method of controlling an information processing apparatus as claimed in claim 12, wherein the first memory is a ROM which stores the program, and the second memory is a RAM to which the program can be transferred from the ROM, and the step of setting the address is followed before the program which is stored in the ROM is executed in the CPU, wherein an address of the program space in a logical memory space of the CPU is set in a physical address of the program stored in the ROM or physical address of the RAM to which the program is transferred.

14. A method of controlling an information processing apparatus as claimed in claim 13, wherein the RAM is a high-speed RAM incorporated in the CPU.

15. A method of controlling an information processing apparatus as claimed in claim 13, wherein the program having a plurality of program modules is recorded, the method thereof including a copying step for copying the program on a program module unit basis from the ROM to the RAM.

16. A method of controlling an information processing apparatus as claimed in claim 12, wherein the first memory is a RAM connected to the CPU via an external bus; and the second memory is a high-speed RAM incorporated in the CPU.

17. A method of controlling an information processing apparatus as claimed in claim 16, wherein the working area is a stack for retaining a register in the CPU, an input buffer for temporarily storing input data to be processed in the CPU, an output buffer for temporarily storing the output data processed in the CPU or an intermediate buffer for temporarily storing intermediate data to be processed in the CPU.

18. A method of controlling an information processing apparatus as claimed in claim 12, wherein the checking step occurs at a time of starting the information processing apparatus.

19. A method of controlling an information processing apparatus as claimed in claim 12, wherein the capacity checking step occurs at a the time of commencing each job.

20. A method of controlling an information processing apparatus as claimed in claim 19, wherein a job control command is interpreted to estimate the marginal space capacity of the second memory during the capacity checking step.

21. A method of controlling an information processing apparatus as claimed in claim 19, wherein an opening step for opening an area allocated to the second memory is performed when each job is terminated.

22. A record medium having a program thereon for controlling an information processing apparatus, wherein said program comprises:

means for controlling the information processing apparatus comprising a CPU, a first memory which secures one of a storage area for storing a printing-related program executed by the CPU and a working area of the CPU, a second memory which secures one of at least part of the storage area and a working area at a higher speed than the first memory, means for executing an address setting process means for setting one of at last part of an address of the storage area and the working area out of a logical memory space of the CPU in one of a physical addresses of the first and second memories, and a capacity checking process means for deciding the marginal space capacity of the second memory prior to translating the address, wherein the address setting process means performs a first step of step of setting one of the address of the storage area and the working area of the logical memory space of the CPU in the physical address of the first memory when a marginal space capacity of the second memory is determined to be insufficient, and a second step of setting one of the address of the storage area and the working area of the logical memory space of the CPU in one of the physical address allocated to the storage area and the working area of the second memory when the marginal space capacity of the second memory is determined to be sufficient;

wherein said marginal space capacity can be determined to be insufficient when said marginal space capacity is a non-zero amount that is less than a required capacity.

23. A record medium as claimed in claim 22, wherein a said program further includes means for executing a process of interpreting a job control command to estimate the marginal space capacity of the second memory when a capacity of the second memory is checked.

* * * * *

UNITED STATES PATENT AND TRADEMARK OFFICE
CERTIFICATE OF CORRECTION

PATENT NO. : 6,345,350 B2
DATED : February 5, 2002
INVENTOR(S) : Michio Maruyama and Kazuyoshi Utsumi It is certified that error appears in the above-identified patent and that said Letters Patent is hereby corrected as shown below:

<u>Title page,</u>
Item [75], the first named inventor reading "Mitio Maruyama" should read
-- Michio Maruyama--.

Signed and Sealed this

Twelfth Day of August, 2003

JAMES E. ROGAN
*Director of the United States Patent and Trademark Office*